Patented Dec. 18, 1945

2,391,113

UNITED STATES PATENT OFFICE 2,391,113

LUBRICATING COMPOSITION

John C. Zimmer, Union, and Arnold J. Morway, Clark Township, Union County, N. J., assignors to Standard Oil Development Company, a corporation of Delaware No Drawing. Application December 19, 1942, Serial No. 469,513

2 Claims. (Cl. 252—36)

The present invention relates to an improved lubricant of the grease type and more particularly to grease compositions which are water-resistant and capable of maintaining adequate lubrication at elevated temperatures and under severe loading conditions.

In a steel mill, steel ingots are transformed into rods or sheets by a series of operations all of which involve passing the hot ingot or billets made therefrom through ponderous rolls where the piece of steel is reduced in cross sectional area. These rolls are supported by bearings generally known as roll-neck bearings. For many years the lubrication of roll-neck bearings has afforded a serious problem. In this respect considerable use in supporting roll-necks has been made of oilless bearings of laminated fibrous material construction lubricated by water. Such bearings can be tolerated in small mills where the operating speeds are slow. However, they require frequent adjusting and replacement and where the mill is operated only intermittently all water must be removed from each bearing during the shut-down period in order to prevent serious corrosion of the roll-neck. Considerable improvement in steel mill construction and operation was accomplished by supporting roll-necks on anti-friction bearings, but this type of bearing also presents difficulties. It is practically impossible to construct this size and type of bearing so as to seal in the oil which is required for lubrication. Also the water off the rolls, which are water-cooled to prevent overheating, tends to get into the anti-friction bearing and wash away the oil so that attempts to lubricate anti-friction roll-neck bearings with oil have met with little success due to leakage of the oil and washing away by water. Attempts to lubricate anti-friction roll-neck bearings with semi-solid lubricants, such as grease, had to overcome the presence of water and the extreme loads under which the roll-neck operated. Considerable success in the lubrication of roll-neck bearings has been attained by the use of a calcium-lead soap grease. Such a grease is not seriously affected by the presence of water and is not readily displaced under heavy pressures. However the calcium-lead soap greases have been found to be inadequate when the mills are operated at anywhere near full capacity. It has been found that when the steel mills are operated at or near full capacity the grease structure of the calcium-lead soap greases breaks down, liberating the oil which is quickly lost through leakage. Without any intention of being bound thereby, applicants are of the opinion that the breakdown of the calcium-lead soap greases used in steel mill operation may be due to heat or continuous pressure or perhaps both.

The principal object of the present invention is to provide a grease composition which will provide satisfactory lubrication for roll-neck bearings even when such roll-neck bearings are operated continuously at full load. Other and further objects will be apparent to those skilled in the art upon reading the following description.

It has now been found that a mineral lubricating oil thickened to a semi-fluid or solid consistency by the addition thereto of a combination of lithium and lead soaps will provide a lubricating composition capable of adequately lubricating roll-neck bearings even when such bearings are operated at their utmost capacity. In addition to the lead and lithium soaps other ingredients such as buffering agents, anti-oxidants and extreme pressure additives may be incorporated in the grease composition if desired.

Although any of the numerous types of lubricating oils may be used as the base for the compositions made in accordance with this invention, it is preferred to use a refined asphaltic or sulphurized asphaltic base lubricating oil having a viscosity in the range of from about 50 seconds to 100 seconds S. S. U. at 210° F.

For the formation of the lithium soaps utilized in the production of the grease compositions of this invention, any soap stock such as saturated or unsaturated fats of either vegetable or animal origin, such as stearin or cotton seed oil or the saturated or unsaturated fatty acids derived therefrom such as stearic acid or oleic acid, may be used, although it is preferred to use the saturated acids derived from hydrogenated fish oil. In the production of the lead soaps it is preferred to use oleic or naphthenic acid although any monocarboxylic acid having an iodine number of less than 20 can be employed. The preferred compositions also include a buffering agent such as aluminum stearate for stabilizing the hydrogen-ion concentration, an oxidation inhibitor such as zinc naphthenate or the zinc salt of a monocarboxylic acid having an iodine number less than 20 and additional additives for increasing the load-bearing characteristics of the grease such as sulfurized sperm oil or chlorinated wax.

The amount of lithium soap in the composition will vary somewhat according to the nature and viscosity of the lubricating oil used ranging generally between 5 and 25% by weight based upon the weight of the composition. The lead soaps are employed in the range of from 5 to 15% by weight depending upon the solubility of the lead soap in the particular oil used, although it is preferred to incorporate as much lead soap as the oil will carry. The amount of buffer and oxidation inhibitor used will each range from about 0.1-1%, while from about 1-20% of additional E. P. additives may be incorporated if desired. Any of the methods customarily employed in the compounding of greases may be used in the production of the compositions of this invention. The soaps may be produced separately and then mixed with the oil by heat and agitation; or preferably the soap stock to be combined with the lithium may be dissolved in a portion of the lubricating oil by heating the oil sufficiently (150° F.) to dissolve the soap stock in the oil, reacting the fat or fatty acid soap stock with lithium hydroxide and then all but a small proportion of the remainder of the lubricating oil having the aluminum stearate and zinc soap dispersed therein, may be added after which the mixture is brought to a clear solution (350-425° F.) and the water driven off by heating and stirring. Heating is then discontinued and the mixture permitted to cool to room temperature. The lead soap and E. P. additives, if any, are then intimately incorporated into the composition by stirring. Grease compositions made in accordance with the foregoing description have been found to possess very marked characteristics such as high melting point, resistance to the action of water, excellent lubricating ability at high loads and a smooth, buttery structure which makes them admirably adapted for use in grease pumping systems where grease is dispersed to the bearing through a system of conduits from a central reservoir.

The following example will serve to illustrate the principles, as well as providing one specific embodiment of the present invention.

*Example*

| | Per cent |
|---|---|
| Hydrogenated fish oil acid | 8.00 |
| Lithium hydroxide (monohydrate) | 1.29 |
| Aluminum stearate | 0.50 |
| Zinc naphthenate | 0.50 |
| Lead oleate | 9.00 |
| Chlorinated wax | 2.00 |
| Asphaltic base lubricating oil, 72 vis. at 210° F | 78.71 |

In compounding the above formula the hydrogenated fish oil acids and approximately ⅓ of the oil are charged into a fire-heated kettle equipped with agitators.

The mixture is then heated and stirred to a temperature of about 150° F. or until all the acid is melted and dissolved in the oil and then the lithium hydroxide dissolved in boiling water is added to the acid-oil solution. Analysis at this point should show the product to be neutral or slightly basic. The lead oleate and chlorinated wax are dissolved in an amount of the remaining lubricating oil approximately equal by weight to the weight of the lead oleate and chlorinated wax. The balance of the oil along with the aluminum and zinc soaps dispersed or dissolved in the oil is then added to the kettle. The temperature is then raised to 400 to 410° F. and stirring and heating stopped. After the grease has cooled to room temperature, the oil solution of lead soap and chlorinated wax is then added and thoroughly incorporated in the grease by stirring. The grease thus produced has the following characteristics:

| | |
|---|---|
| A. S. T. M. worked penetration at 77° F | 272 |
| A. S. T. M. melting point °F | 360 |
| Timken test | 43 O. K. load |
| Water solubility | Nil |
| Emulsification with water: Per cent water held in grease in a stable emulsion—further additions will be thrown out per cent | 40 |

In the foregoing formula the 78.71% of asphaltic base lubricating oil and 2% of chlorinated wax may be replaced by 80.71% of sulfurized asphaltic base lubricating oil.

What is claimed is:

1. A water-resistant, high temperature, extreme pressure lubricant of the grease type, consisting of about 78.71% asphaltic base lubricating oil having a viscosity of 72 S. S. U. at 210° F., 9.29% lithium soap of hydrogenated fish oil acids, 9% lead oleate, 0.5% zinc naphthenate, 0.5% aluminum stearate and 2% chlorinated wax.

2. A water-resistant, high temperature, extreme pressure lubricant of the grease type, consisting of about 80.71% of sulfurized asphaltic base lubricating oil, 9.29% lithium soap of hydrogenated fish oil acid, 9% lead oleate, 0.5% zinc naphthenate, 0.5% aluminum stearate.

JOHN C. ZIMMER.
ARNOLD J. MORWAY.